(12) United States Patent
Kanadam

(10) Patent No.: US 9,106,514 B1
(45) Date of Patent: Aug. 11, 2015

(54) HYBRID NETWORK SOFTWARE PROVISION

(75) Inventor: Raghuram Kanadam, Sunnyvale, CA (US)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 266 days.

(21) Appl. No.: 12/982,381

(22) Filed: Dec. 30, 2010

(51) Int. Cl.
G06F 9/54 (2006.01)
H04L 12/26 (2006.01)
H04L 29/08 (2006.01)

(52) U.S. Cl.
CPC .............. H04L 43/04 (2013.01); H04L 67/32 (2013.01); G06F 9/54 (2013.01); H04L 69/329 (2013.01)

(58) Field of Classification Search
USPC ...................................... 726/11–13
See application file for complete search history.

(56) References Cited

U.S. PATENT DOCUMENTS

| | | | |
|---|---|---|---|
| 5,067,104 A | 11/1991 | Krishnakumar et al. | |
| 5,459,837 A | 10/1995 | Caccavale | |
| 5,485,409 A | 1/1996 | Gupta et al. | |
| 5,892,903 A | 4/1999 | Klaus | |
| 6,088,804 A | 7/2000 | Hill et al. | |
| 6,324,656 B1 | 11/2001 | Gleichauf et al. | |
| 6,363,477 B1 | 3/2002 | Fletcher et al. | |
| 6,546,554 B1 * | 4/2003 | Schmidt et al. | 717/176 |
| 6,574,737 B1 | 6/2003 | Kingsford et al. | |
| 6,584,569 B2 | 6/2003 | Reshef et al. | |
| 6,609,205 B1 | 8/2003 | Bernhard et al. | |
| 6,654,914 B1 | 11/2003 | Kaffine et al. | |
| 6,952,779 B1 | 10/2005 | Cohen et al. | |
| 7,152,105 B2 | 12/2006 | McClure et al. | |
| 7,159,151 B2 | 1/2007 | Morgan et al. | |
| 7,178,166 B1 | 2/2007 | Taylor et al. | |
| 7,185,232 B1 | 2/2007 | Leavy et al. | |
| 7,243,148 B2 | 7/2007 | Keir et al. | |

(Continued)

FOREIGN PATENT DOCUMENTS

WO 2006/099536 9/2006

OTHER PUBLICATIONS

Wagner, D. et al., "Intrusion Detection via Static Analysis", IEEE Symposium on Security and Privacy, 2001, pp. 156-168.

(Continued)

*Primary Examiner* — Jung Kim
*Assistant Examiner* — Tri Tran
(74) *Attorney, Agent, or Firm* — Haynes Beffel & Wolfeld LLP

(57) ABSTRACT

Various example embodiments are methods and devices for providing an application from at least one remote machine to at least one local machine. The local machine may execute a local executable that has access to local resources of the computer device. The local machine may also execute a browser configured to communicate with the at least one remote machine through a firewall. A connection may be generated between the browser and the local executable. The local machine may download code for implementing a portion of the application from the at least one remote machine through the firewall. The code may be executed in the browser. The browser may generate an instruction directing the local executable to act on the local resources of the computer device. The instruction may be communicated to the local executable via the connection. The local executable may act on the local resources of the computer device in response to the instruction and return to the browser results of the action on the local resources.

24 Claims, 14 Drawing Sheets

(56) References Cited

U.S. PATENT DOCUMENTS

| | | | |
|---|---|---|---|
| 7,257,630 B2 | 8/2007 | Cole et al. | |
| 7,272,650 B2 | 9/2007 | Elgebaly et al. | |
| 7,290,145 B2 | 10/2007 | Falkenthros | |
| 7,315,801 B1 | 1/2008 | Dowd et al. | |
| 7,342,892 B2 | 3/2008 | Soon et al. | |
| 7,346,922 B2 | 3/2008 | Miliefsky | |
| 7,421,621 B1 | 9/2008 | Zambrana | |
| 7,447,966 B2 | 11/2008 | Kamannavar et al. | |
| 7,451,488 B2 | 11/2008 | Cooper et al. | |
| 7,471,999 B2 | 12/2008 | Taki | |
| 7,509,675 B2 | 3/2009 | Aaron | |
| 7,512,125 B2 | 3/2009 | Betts et al. | |
| 7,536,456 B2 | 5/2009 | Williams et al. | |
| 7,536,605 B2 | 5/2009 | Keaffaber et al. | |
| 7,543,056 B2 | 6/2009 | McClure et al. | |
| 7,607,170 B2 | 10/2009 | Chesla | |
| 7,624,422 B2 | 11/2009 | Williams et al. | |
| 7,627,891 B2 | 12/2009 | Williams et al. | |
| 7,627,900 B1 | 12/2009 | Noel et al. | |
| 7,664,845 B2 | 2/2010 | Kurtz et al. | |
| 7,673,043 B2 | 3/2010 | Keir et al. | |
| 7,774,637 B1 | 8/2010 | Beddoe et al. | |
| 7,954,161 B1 | 5/2011 | Guruswamy et al. | |
| 7,958,230 B2 | 6/2011 | Guruswamy et al. | |
| 7,958,560 B1 | 6/2011 | Guruswamy | |
| 8,001,532 B1* | 8/2011 | Jakubiak et al. | 717/125 |
| 2001/0034847 A1 | 10/2001 | Gaul, Jr. | |
| 2002/0157041 A1 | 10/2002 | Bennett et al. | |
| 2003/0051163 A1 | 3/2003 | Bidaud | |
| 2003/0154399 A1 | 8/2003 | Zuk et al. | |
| 2003/0159063 A1 | 8/2003 | Apfelbaum et al. | |
| 2004/0001443 A1 | 1/2004 | Soon et al. | |
| 2004/0068586 A1 | 4/2004 | Xie et al. | |
| 2004/0068675 A1 | 4/2004 | Liu | |
| 2004/0103315 A1 | 5/2004 | Cooper et al. | |
| 2004/0205557 A1 | 10/2004 | Bahrs et al. | |
| 2004/0230881 A1 | 11/2004 | Gwak | |
| 2005/0015213 A1 | 1/2005 | Somervill et al. | |
| 2005/0044418 A1 | 2/2005 | Miliefsky | |
| 2005/0135391 A1 | 6/2005 | Sung | |
| 2005/0144137 A1 | 6/2005 | Kumar et al. | |
| 2005/0195820 A1 | 9/2005 | Betts et al. | |
| 2005/0248457 A1 | 11/2005 | Himberger et al. | |
| 2005/0273772 A1 | 12/2005 | Matsakis et al. | |
| 2005/0273854 A1 | 12/2005 | Chess et al. | |
| 2005/0273859 A1 | 12/2005 | Chess et al. | |
| 2006/0005231 A1 | 1/2006 | Zuk et al. | |
| 2006/0015941 A1 | 1/2006 | McKenna | |
| 2006/0015943 A1 | 1/2006 | Mahieu | |
| 2006/0021034 A1 | 1/2006 | Cook | |
| 2006/0021044 A1 | 1/2006 | Cook | |
| 2006/0021045 A1 | 1/2006 | Cook | |
| 2006/0021046 A1 | 1/2006 | Cook | |
| 2006/0021047 A1 | 1/2006 | Cook | |
| 2006/0021048 A1 | 1/2006 | Cook et al. | |
| 2006/0021049 A1 | 1/2006 | Cook | |
| 2006/0036755 A1 | 2/2006 | Abdullah et al. | |
| 2006/0080733 A1 | 4/2006 | Khosmood et al. | |
| 2006/0085723 A1 | 4/2006 | Bartz et al. | |
| 2006/0098579 A1 | 5/2006 | Chang et al. | |
| 2006/0106939 A1 | 5/2006 | Cha et al. | |
| 2006/0137009 A1 | 6/2006 | Chesla | |
| 2006/0277606 A1 | 12/2006 | Yunus et al. | |
| 2007/0006037 A1 | 1/2007 | Sargusingh et al. | |
| 2007/0011319 A1 | 1/2007 | McClure et al. | |
| 2007/0086389 A1 | 4/2007 | Park et al. | |
| 2007/0094728 A1 | 4/2007 | Julisch et al. | |
| 2007/0115962 A1 | 5/2007 | Mammoliti et al. | |
| 2007/0174917 A1 | 7/2007 | Guruswamy | |
| 2007/0204347 A1 | 8/2007 | Caceres et al. | |
| 2008/0005555 A1 | 1/2008 | Lotem et al. | |
| 2008/0028416 A1* | 1/2008 | Gill et al. | 719/311 |
| 2008/0072322 A1 | 3/2008 | Guruswamy | |
| 2008/0092237 A1 | 4/2008 | Yoon et al. | |
| 2008/0098479 A1 | 4/2008 | O'Rourke et al. | |
| 2008/0120283 A1 | 5/2008 | Liu et al. | |
| 2008/0155338 A1 | 6/2008 | Rusmanov | |
| 2008/0282352 A1 | 11/2008 | Beddoe et al. | |
| 2009/0077471 A1* | 3/2009 | Lahr et al. | 715/748 |
| 2009/0083854 A1 | 3/2009 | Bozanich et al. | |
| 2009/0271863 A1 | 10/2009 | Govindavajhala et al. | |
| 2009/0320137 A1 | 12/2009 | White et al. | |
| 2009/0328190 A1 | 12/2009 | Liu et al. | |
| 2010/0030891 A1* | 2/2010 | Kim et al. | 709/224 |
| 2010/0106742 A1 | 4/2010 | Guruswamy et al. | |
| 2010/0284282 A1 | 11/2010 | Golic | |
| 2010/0284283 A1 | 11/2010 | Golic et al. | |
| 2010/0293415 A1 | 11/2010 | Beddoe et al. | |
| 2011/0082802 A1* | 4/2011 | Baghdasaryan et al. | 705/75 |

OTHER PUBLICATIONS

Finlay, I. et al., "Multiple Vulnerabilities in Many Implementations of the Simple Network Management Protocol (SNMP)", CERT® Advisory CA-2003-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

PROTOS Test-Suite: c06-snmpv1, University of Oulu (ee.oulu.fi)—http://www.ee.oulu.fi/research/ouspg/protos/testing/c06/snmpv1/index, Oct. 17, 2002, pp. 1-26, Finland.

Beddoe, M., "Network Protocol Analysis using Bioinformatics Algorithms", 2004, retrieved on May 17, 2007, from <URL: http://www.4tphi.net/~awalters/PI/pi.pdf>.

Case, J. et al., "A Simple Network Management Protocol (SNMP)" (RFC 1157), May 1990, retrieved on May 17, 2007, from <URL: http://www.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.

Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL: http://post.queensu.ca/~trd/research/papers/FinalPST04.pdf>.

Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.

Zhang, S. et al., "Applying Software Transformation Techniques to Security Testing", Proceedings: Software Technology and Engineer-

(56) References Cited

OTHER PUBLICATIONS ing in Practice (STEP), Toronto, Canada, Oct. 2005, retrieved on May 17, 2007, from <URL: http://post.queensu.ca/~trd/research/papers/step2005.pdf>.
Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: https://www.blackhat.com/presentations/bh-usa-02/bh-us-02-aitel-spike.ppt>.
Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.
Beddoe, M., "The Protocol Informatics Project: Automating Network Protocol Analysis" (presentation slides), 2005.
Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.
Beizer, B., "Chapter 9: Syntax Testing", in Software Testing Techniques, 2nd Ed., 1990, pp. 284-319, Van Nostrand Reinhold, New York, NY.
Beizer, B., "Chapter 8: Syntax Testing", in Black-Box Testing: Techniques for Functional Testing of Software and Systems, 1995, pp. 177-201, John Wiley & Sons, Inc., New York, NY.
Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.
Mu Security, "6 Degrees of Protocols", 2006.
Mu Security, "Protocol Vulnerability Patterns", Apr. 2006.
Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.
Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.
Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.
Bellovin, S. "A Technique for Counting NATted Hosts", Proceedings: Second Internet Measurement Workshop (IMW), Marseille, France, Nov. 6-8, 2002, pp. 267-272.
Bradner, S. et al., "Benchmarching Methodology for Network Interconnect Devices (RFC_1994)", May 1996, online, retrieved on May 12, 2006, from <URL: http://rfc.net/rfc1944.html>.
Bradner, S. et al., Benchmarking Methodology for Network Interconnect Devices (RFC_2544), Mar. 1999, online retrieved on May 12, 2006, from <URL: http://rfc.net/rfc2544.html>.
Cisco Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatrav.pdf>.
Dunn, J. et. al., "Methodology for ATM Benchmarking (RFC 3116)", Jun. 2011, online, retrieved on May 12, 2006, from <URL: http://rfc.net/rfc3116.html>.
Egevang, K., et al., "The IP Network Address Translator (NAT) (RFC 1631)", May 1994, online, retrieved on May 12, 2006, from <URL: http://rfc.net/rfc3116.html>.
Microsoft Corp., "Overview of Network Address Translation (NAT) in Windows XP", Sep. 12, 2005, online, retrieved on May 12, 2006, from <URL: http://www.microsoft.com/technet/prodtechnol/winxppro/deploy/nattrnsw.mspx?pd=true>.
Netcom Systems, "SmartWindow User Guide Version 6 53", Document No. 340-1020-001 REV C, Dec. 1999, online, retrieved on May 12, 2006, from <URL: https://www.cobra.ee.ntu.edu.tw/~oops/HTML6/08_exp/smartbit%20reading.pdf>.
Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~ljilja/cnl/pdf/milan.pdf>.
Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.
Srisuresh, P. et al., "IP Network Address Translator (NAT) Terminology and Considerations (RFC 2663)", Aug. 1999, online, retrieved on May 12, 2006, from <URL: http://rfc.net/rfc2663.html>.
Srisuresh, P. et al., "Traditional IP Network Address Translator (Traditional NAT) (RFC 3022)", Jan. 2001, online, retrieved on May 12, 2006, from <URL: http://rfc.net/rfc3022.html>.
Trend Communications, "RFC 2544 Testing with Aurora Tango", date unknown, online, retrieved on May 12, 2006, from <URL: http://www.trendtest.co.uk/trendweb/resource.nsf/vlFileURL-Lookup/en%5E%5ERFC+2544+testing/$FILE/GbEnet.2544.test.pdf>.
Udupa, R. et al., "Performance Issues and Evaluation Techniques for Networking Devices", 2001, online, retrieved on May 12, 2006, from URL: http://softwaredioxide.com/Channels/events/testing2001/Presentations/raghavendra_infosys.pdf>.
PCT International Search Report and Written Opinion, PCT/US06/09512, Aug. 31, 2006.
Wikipedia.com, Active Directory, http://en.wikipedia.org/wiki/Tunneling_protocol.
Wikipedia.com, Active Directory, http://en.wikipedia.org/wiki/Session_initiation.
Gordano.com, What is the SMTP/EHLO clause.
U.S. Appl. No. 11/514,809, filed Sep. 1, 2006.
U.S. Appl. No. 11/859,691, filed Sep. 21, 2007.
U.S. Appl. No. 11/351,402, filed Feb. 10, 2006.
U.S. Appl. No. 11/696,605, filed Apr. 4, 2007.
U.S. Appl. No. 13/153,797, filed Jun. 6, 2011.
U.S. Appl. No. 13/101,728, filed May 5, 2011.
U.S. Appl. No. 13/118,155, filed May 27, 2011.
U.S. Appl. No. 13/154,636, filed Jun. 7, 2011.
U.S. Appl. No. 13/095,807, filed Apr. 27, 2011.
U.S. Appl. No. 11/760,600, filed Jun. 8, 2007.
U.S. Appl. No. 12/234,450, filed Jun. 8, 2007.
U.S. Appl. No. 11/850,164, filed Sep. 5, 2007.

* cited by examiner

ARP, Request who-has 192.168.30.139 tell 192.168.30.248, length 46
    0x0000:  0001 0800 0604 0001 0004 275b cf00 c0a8  ..........'[....
    0x0010:  1ef8 0000 0000 0000 c0a8 1e8b 0000 0000  ................
    0x0020:  0000 0000 0000 0000 0000 0000 0000       ..............

IP 192.168.30.248 > 224.0.0.10: EIGRP Hello, length: 40
    0x0000:  45c0 003c 0000 0000 0258 f7ff c0a8 1ef8  E..<.....X......
    0x0010:  e000 000a 0205 ee69 0000 0000 0000 0000  .......i........
    0x0020:  0000 0000 0000 0064 0001 000c 0100 0100  .......d........
    0x0030:  0000 000f 0004 0008 0c03 0102

IP 192.168.30.248.520 > 224.0.0.9.520: UDP, length 24
    0x0000:  45c0 0034 0000 0000 0211 f84f c0a8 1ef8  E..4.......O....
    0x0010:  e000 0009 0208 0208 0020 5245 0202 0000  ......... RE....
    0x0020:  0002 0000 c0a8 2800 ffff ff00 0000 0000  ......(.........
    0x0030:  0000 0001

```
"id":1,
"offset":40,
"length":66,
"pcap":1,
"flow":1,
"time":0,
"dir":0,
"src":"192.168.30.248",
"dst":"192.168.30.248",
"service":"HTTP",
"title":"GET /index.html HTTP/1.1"
```

HYBRID NETWORK SOFTWARE PROVISION

BACKGROUND

Computer software applications are provided to users according to various different models. With a packaged application model, applications are executed directly by a local machine. Executables and other data or files making up the application are installed to the local machine from a network or from a disk. Once installed, the application executes locally and typically has access to the resources of the local machine, including local data. Data processed by the application is also stored locally, either at the local machine itself or at other machines that are part of a common secured network (e.g., a company or organizational network). Packaged applications are local machine specific. Accordingly, an organization must purchase a license for each local machine that will execute the application regardless of the number of users or the frequency of use. Also, any updates, improvements, bug-fixes, or new versions of the packaged applications must be directly installed to each local machine. This limits the degree to which packaged applications can be practically maintained and upgraded.

Cloud computing provides an alternative application hosting paradigm that is often called software-as-a-service (SaaS). According to cloud computing or SaaS techniques, software applications are executed by remote servers. Local machines access the remote servers, and the applications, via a network, such as the Internet. The local machines execute a client interface (e.g., either a standard web browser or a dedicated client program that gives the local machines access to the remotely executed SaaS application). Due to the nature of SaaS, changes made to an application at the remote servers are distributed to all local users and machines without the need to specifically load new data files to each local machine. This makes it easier for providers and developers to generate and distribute new features as well as standard bug-fixes and other improvements. Because SaaS applications are hosted remotely, however, it is necessary for data processed by the application to be either transmitted to and/or accessible to the remote servers, which are located outside of the local machine and usually outside of a secure network. This creates a strong disincentive for using cloud computing and/or SaaS for processing that involves sensitive data. Also, depending on the implementation, SaaS applications require the local execution of dedicated plug-ins in order to access local resources such as printers, speakers, etc. This further complicates the use of SaaS applications in some environments.

FIGURES

Various example embodiments of the present invention are described here by way of example in conjunction with the following figures, wherein:

FIG. 6 illustrates one example embodiment of a screen showing captured communications packets.

FIG. 7 illustrates one example embodiment of a screen showing statistics describing a packet capture.

DESCRIPTION

Figure 1:
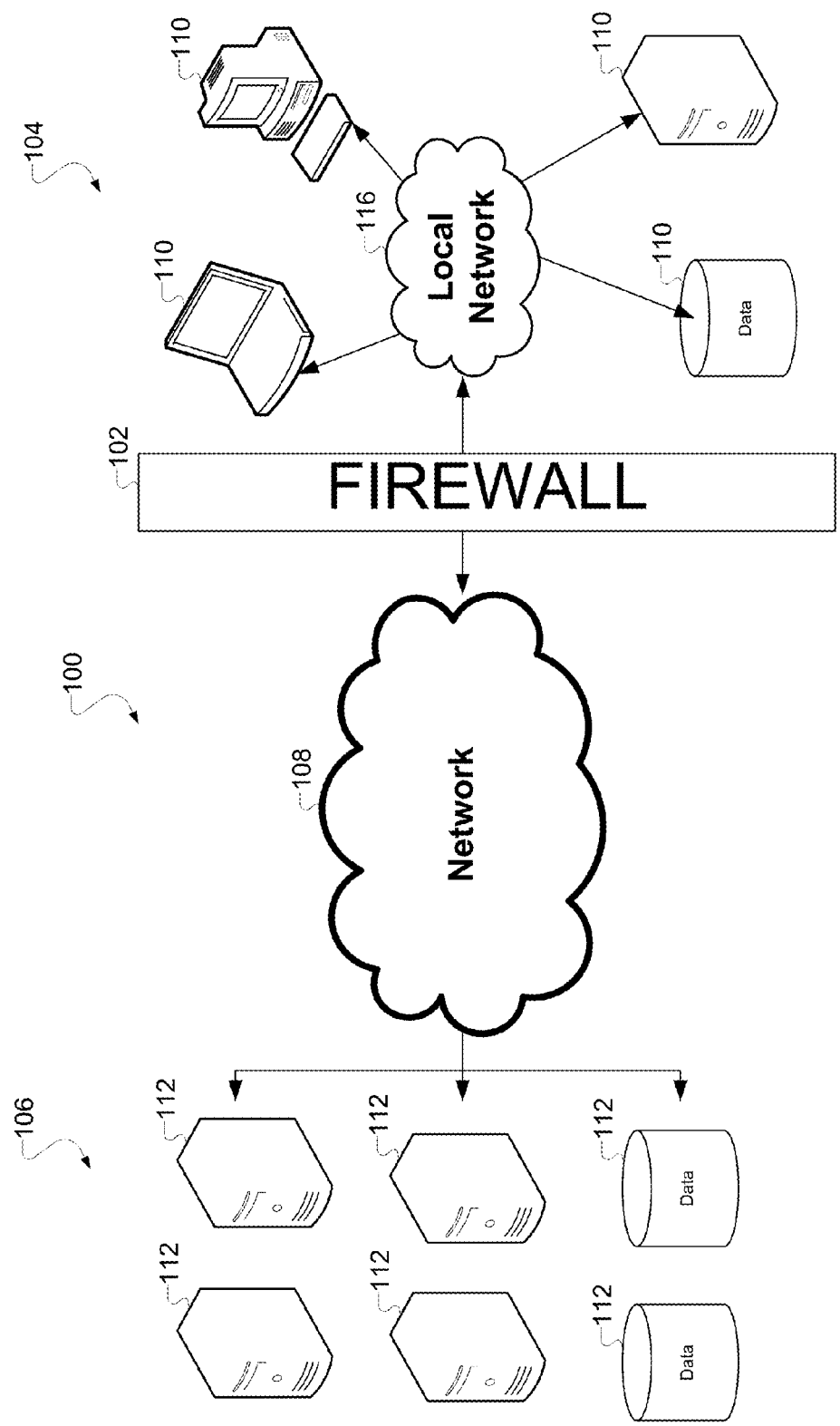
FIG. 1 illustrates one example embodiment of a computer system that delivers an application to a local machine.

Various example embodiments are directed to systems and methods for delivering an application to a local side comprising one or more local machines. High level functionality of the application may be hosted by a remote side, or cloud. The remote side may comprise one or more remote machines (e.g., a cloud). Lower level functionality of the application may be handled by a local side. The local side may comprise one or more local machines, which may be in communication with one another (e.g., via a local network.). For example, the local side may be or comprise a network implemented by a company, enterprise or other organization. The local and remote sides may be in communication with one another (e.g., via a wide area network, such as the Internet). In various example embodiments, the local side may utilize a firewall to block some or all forms of communication with the remote side.

The high level functionality of the application hosted by the remote side may include, for example, basic functionality defining the general utility of the application. The lower level functionality hosted by the local side may comprise functions for accessing and manipulating local resources including local data. For example, in various embodiments, the application may be designed to capture and/or analyze communications packets (e.g., Internet protocol or IP packets). In these example embodiments, the high level functionality hosted by the remote side may define, for example, analyses that may be performed on packet captures, searches for identifying packets having certain characteristics, operations for generating synthetic network traffic based on packet captures, a user interface for presenting the results of other operations, etc. The lower level functionality may actually operate on the packets and packet captures (e.g., local resources). For example, the lower level functionality may define operations used to implement the high level functionality on packets and packet captures present on the local side (e.g., local data). The division between high and lower level functionality may be similar for applications directed to other computing tasks. For example, when the application is directed to a word processor, the high level functionality may involve different fonts, macros, formatting arrangements, spell checkers, etc. The lower level functionality may have access to local storage to identify document files to be opened, perform actual modifications to stored document files, etc. The respective high and low level functionalities may, but need not be, application specific. For example, low level functionality hosted on the local side may be used with more than one application or application type.

Access to the application from the local machine may be facilitated by a local executable and a browser. The local executable may be implemented by the local machine and/or another machine on the local network. The local executable may comprise a single executable file or, in some example embodiments, may comprise additional executable and/or non-executable files. For example, non-executable files may include ".dll" files or other files comprising data supporting one or more executable files. In various example embodiments, the local executable may comprise a function set with functions for accessing and/or manipulating local resources. The function set may be accessed externally by calling one or more specific functions through an application programming interface (API). In addition to the function set and the API, the local executable may provide an interface for making the API accessible to outside applications and/or other executables. The interface may be secure and, in various example embodiments, may limit API access to applications and/or executables running on the local machine itself and/or running on other machines that are part of the local network (e.g., machines behind the firewall). In some example embodiments, the interface may comprise web server functionality capable of forming a secure connection via hypertext transfer protocol (HTTP), HTTPS and/or any other suitable protocol.

The browser may serve as a link between the remote side and the local executable. For example, in various embodiments, the browser may allow the remote side to provide instructions to the local executable without providing the remote side with direct control over or access to local resources. The browser itself may be executed locally by the local machine or another machine on the local network. In various example embodiments, the browser may be a web browser, another type of browser and/or a dedicated custom package. In some example embodiments, the browser may form a secure connection with the local executable. Instructions from the remote side representing the high-level functionality of the application may be received by the browser in the form of generally executable code. In various example embodiments, the generally executable code may be executed without regard to hardware, operating system or other machine-specific parameters. For example, the generally executable code may be in the form of a scripting language such as JAVASCRIPT.

In various example embodiments, the generally executable code may be executed by the local machine or other local device within the context of the browser. For example, the browser may limit the execution of the code to prevent it from accessing local resources, including local data, except through the browser. When the generally executable code needs to access local resources, it may generate instructions to the local executable. The instructions may be passed to the local executable by the browser (e.g., via the secure connection between the browser and the local executable). Accordingly, the high level functionality of the application may be provided through the cloud, while lower-level access to and manipulation of local resources may be handled by the local executable. In this manner, a provider of the application may be able to update the application to fix bugs and/or add new features without the need to modify application executables or other files on every local machine that accesses the application. Also, sensitive local data and other local resources may remain inaccessible and/or transparent to the cloud.

FIG. 1 illustrates one example embodiment of a computer system 100 that delivers an application to a local machine. The system 100 may include a local side 104 and a remote side 106. The local side 104 may include a local network 116 facilitating communication between a plurality of local machines 110. The local machines 110 may include any suitable types of computer devices or machines including, for example, laptop computers, desktop computers, servers, databases or other data stores, etc. Although the local side 104 is illustrated in FIG. 1 to include a network 114 and multiple local machines 110, in some example embodiments, the local side 104 may include a single local machine 110. The remote side 106 may include one or more remote machines 112, which may include any types of computer devices and/or constructs including, for example, servers, other computers, data stores, etc. The remote machines 112 may be physically located at a single location, or may be distributed across two or more physical locations. The remote side 106 and the local side 104 maybe in communication with one another via a network 108, which may be a wide area network (WAN) such as the Internet. The local side 104 may be separated from the network 108 by a firewall 102. The firewall 102 may screen communications (e.g., packets) to and from local machines 110, for example, to prevent malicious access to the local machines 110.

Figure 2:
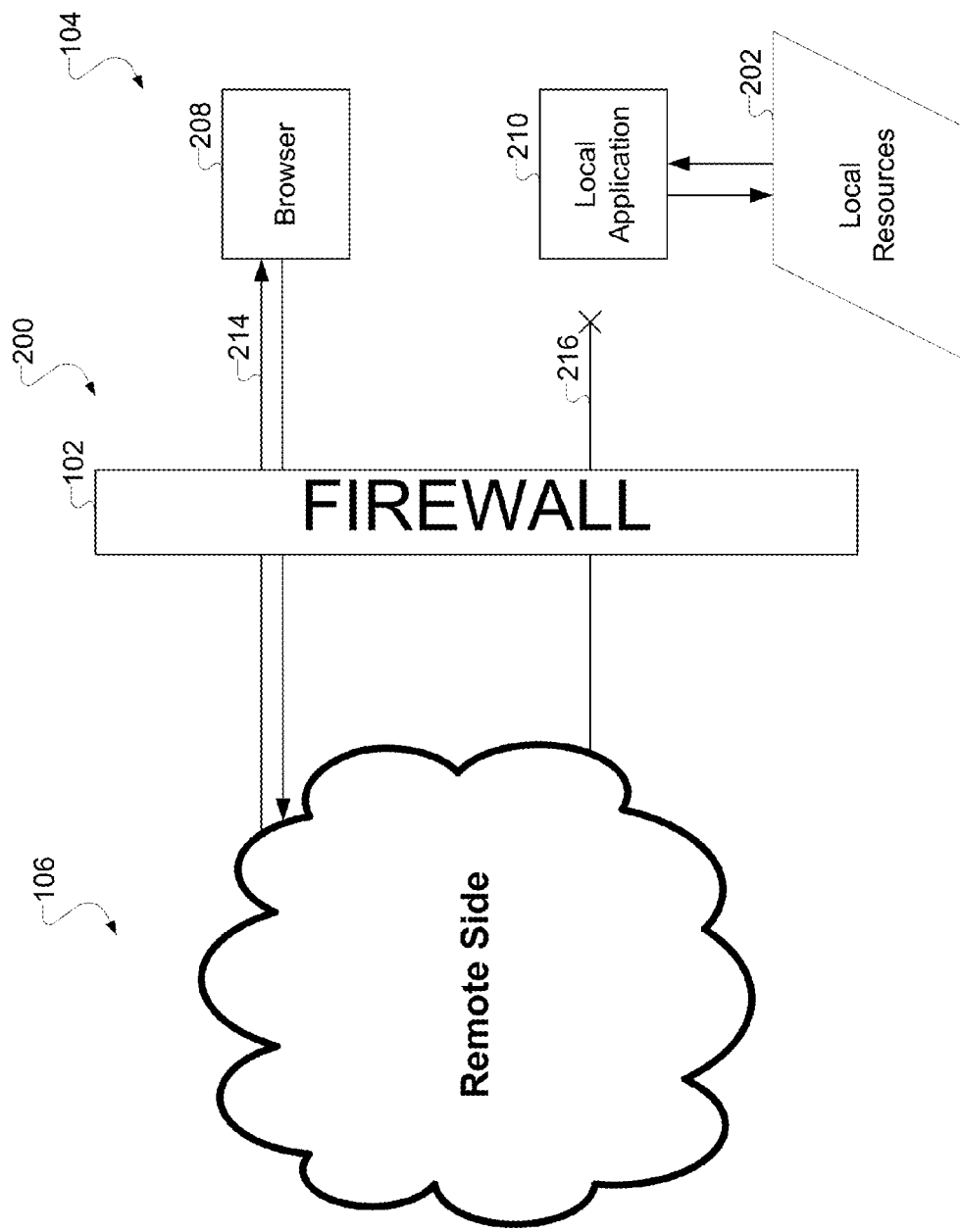
FIG. 2 illustrates one example embodiment of a network showing the execution of a local application and a browser, such as a web browser.

FIG. 2 illustrates one example embodiment of a network 200 showing the execution of a local application 210 and a browser 208, such as a web browser. The local application 210 is shown with access to local resources 212. The local resources may include, for example, local data, local input/output devices, such as printers, local data storage, etc. It will be appreciated that the browser 208, local application 210 and local resources 212 may be stored and/or hosted at any local machine 110. In some example embodiments, the browser 208, local application 210 and local resources 212 may be hosted at a common local machine 110. In other example embodiments, hosting of the browser 208, local application 210 and local resources 212 may be distributed across multiple local machines 110 on the local side 104.

The browser 208 may be in communication with the remote side 106 through the firewall 102, as indicated by arrows 214. In some example embodiments, the firewall 102 may be configured to allow packet traffic on one or more ports utilized by the browser 208 to access the remote side 106, as indicated by arrows 214. For example, in some configurations, the firewall 102 may be configured to allow communications to and from the browser 208 on port 80. Communication between the local application 210 and the remote side 106, on the other hand, may be blocked by the firewall 102. For example, the local application 210 may be prevented from communicating with any ports utilized by the browser 208. Further, any ports that could potentially be used for communication between the local application 210 and the remote side 106 may be blocked, as indicated by blocked arrow 216. In this manner, remote machines 112 on the remote side 106 may be prevented from directly contacting the local application 210 and, therefore, may be prevented from directly accessing the local resources 212.

Figure 3:
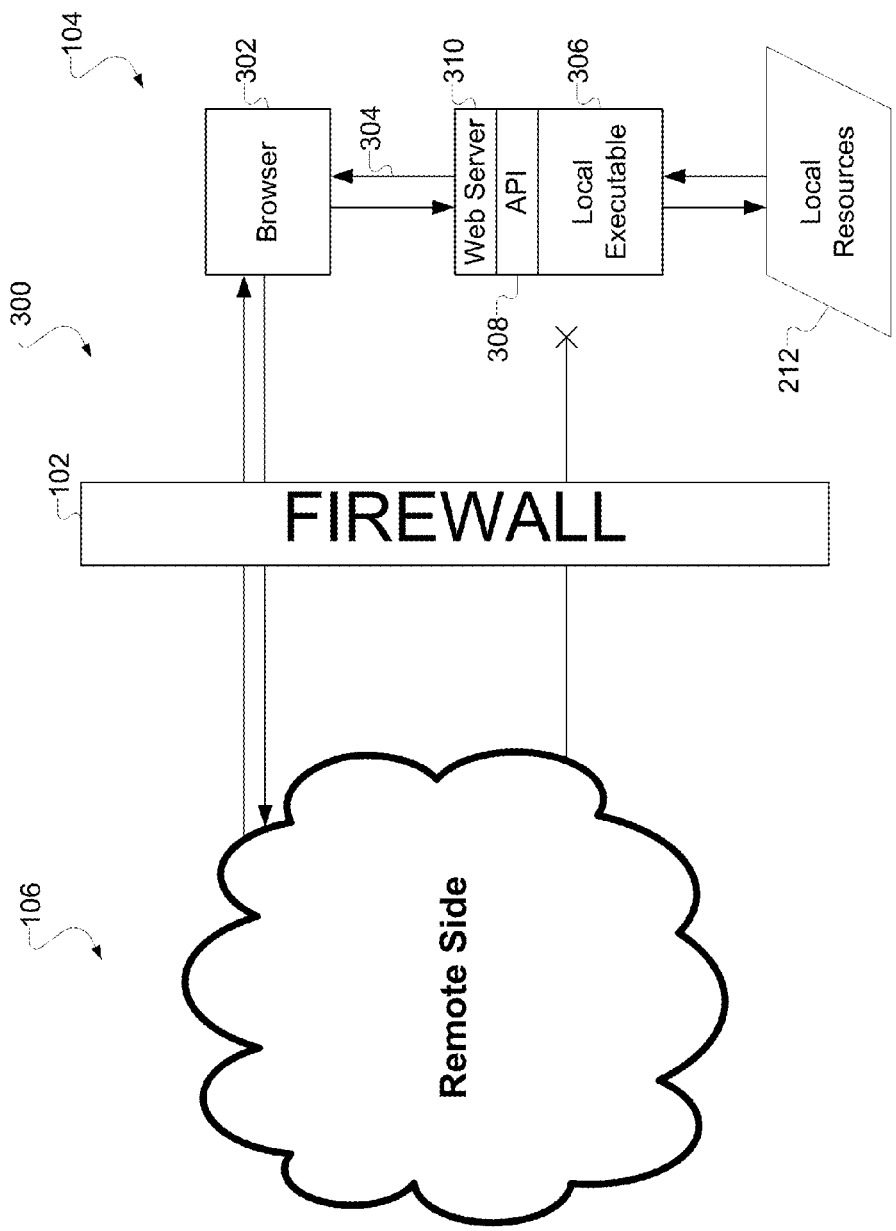
FIG. 3 illustrates one example embodiment of a network showing the provision of an application from the remote side to the local side.

FIG. 3 illustrates one example embodiment of a network 300 showing the provision of an application from the remote side 106 to the local side 104. At the local side 104, a browser 302 may be in communication with the remote side 106 through the firewall 102. For example, as described above, the firewall 102 may be configured to allow communications on a port or ports utilized by the browser 302 to access the remote side 106. The browser 302 may be any suitable type of browser. For example, the browser 302 may be a web browser such as, for example, INTERNET EXPLORER available from MICROSOFT, CHROME available from GOOGLE, FIREFOX available from MOZILLA, OPERA available from OPERA software, SAFARI available from APPLE, etc. In some example embodiments, the browser may be another type of browser, and/or a custom coded interface.

Local executable 306 may be in communication with the local resources 212, in a manner similar to the way that of local application 210. The local executable 306 may also implement an application programming interface (API) 308. The API may define a function set of the local executable 306 and enable the function set to be called by external applications, such as the browser 302, as described below. In addition to the API 308, the local executable 306 may also implement an interface 310, illustrated as a web server in FIG. 3. The interface may allow access to the API 308 and, in various example embodiments, may limit access to the API according to predefined parameters. For example, in some embodiments the interface 310 may limit access to the API 308 to applications hosted on the local side 104, such as the browser 302. The interface 310 and the browser 302 may form a connection 304 allowing the browser 302 to provide instructions to the local executable 306 according to the API 308. In various example embodiments, the connection 304 may be secure. For example, the connection 304 may be configured according to any secure and/or encrypted communication standard including, for example, Secure Sockets Layer (SSL), dual-key encryption, etc.

In the example configuration shown in FIG. 3, the browser 302 may access an application hosted on the remote side 106. When the remotely hosted application needs to access and/or manipulate local resources 212, the browser 302 may generate an instruction to the local executable 306. The form of the instruction may be defined by the API 308. The instruction may be passed from the browser 302 to the local executable 306 via the connection 304. A return to the instruction may be provided by the local executable 306 to the browser 302.

Figure 4:
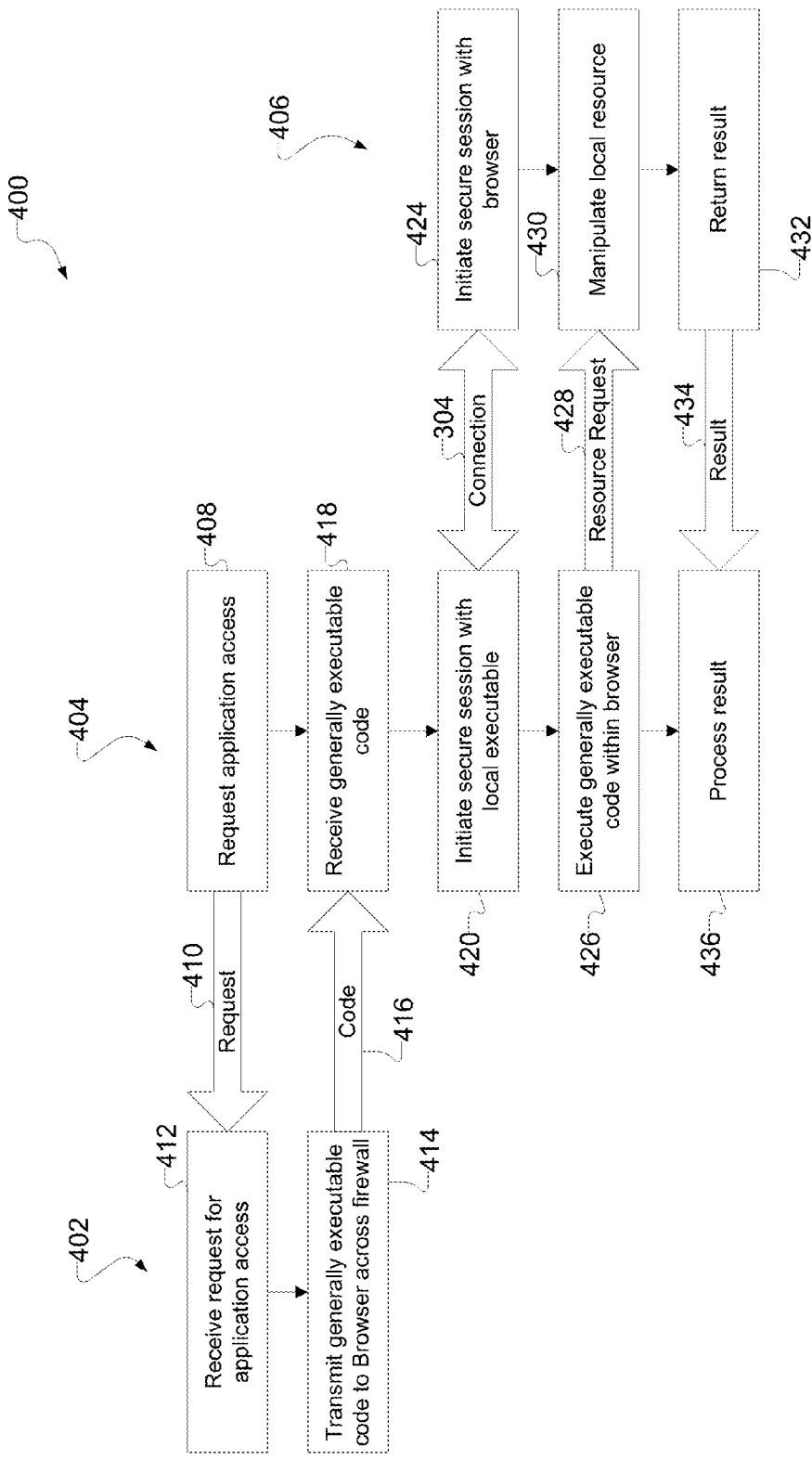
FIG. 4 illustrates one example embodiment of a process flow for providing a remotely hosted application to a local machine and/or machines.

FIG. 4 illustrates one example embodiment of a process flow 400 for providing a remotely hosted application to a local machine and/or machines. Columns 402, 404 and 406 may generally indicate actors associated with the described boxes. For example, column 402 may represent the actions of one or more remote machines 112 on the remote side 106. Column 404 may represent actions of the browser 302, while column 406 may represent actions of the local executable 306. At 408, the browser 302 may request access to the remotely hosted application. For example, a user at the browser 302 may access an internet address associated with the application (e.g., utilizing a Universal Resource Locator or URL). In various example embodiments, the request 410 to access the application may take the form of a request to access the internet address. The request 410 may be transmitted across the firewall 102.

The remote side 106 may receive the request 410 at 412. Upon receipt of the request 412, the remote side 106 may transmit generally executable code 416 to the browser 302. The code 416, again, may be transmitted across the firewall 102. In various example embodiments, the remote side 106 may ensure that the local side 104 is entitled to run the application prior to sending the generally executable code. For example, the remote side 106 may determine whether the local side 104 and/or a specific local machine has a license to the application, whether certain licenses are or are not in use, etc. The generally executable code may be any sort of code that may be executed without regard to hardware, operating system or other machine-specific parameters. For example, the generally executable code may be organized according to a scripting language such as ECMCASCRIPT, JAVASCRIPT, JSCRIPT, ACTIONSCRIPT, etc. The code 416 may define the high level functionality of the application.

In some example embodiments, the code 416 need not be generally executable and, instead, may be or may include a hardware specific executable. For example, the remote side 106 may store multiple versions of the code 416, with each version corresponding to a hardware configuration of potential local machines 110. Also, although the process flow 400 shows the browser 302 initiating access to the application, in some example embodiments, the remote side 106 may initiate access to the application. For example, the application may be configured to perform certain tasks at prescheduled times. Examples of such application example embodiments may include, applications for testing communications traffic, applications that scan for viruses or other malware, applications for executing packet captures at certain intervals, etc. At 418, the browser 302 may receive the generally executable code 416.

At 420 and 424, the browser 302 and local executable 306 may generate the connection 304. The connection 304, as described above, may be secure. It will be appreciated that the connection 304 may be initiated by either the browser 302 or the local executable 306. The process flow shows the initiation of the connection 304 after the browser 302 receives the code 416 from the remote side 106. In various example embodiments, however, the connection 304 may be formed prior to requesting application access 408, prior to receiving the code 418 or at any other suitable time.

At 426, the browser 302 may execute the generally executable code 416. In some example embodiments, the generally executable code may be executed by the browser 302 within the browser 302. In this manner, the browser 302 may limit the execution of the generally executable code and prevent it from accessing the local resources 212. During execution, the generally executable code may have need to access the local resources 212. For example, in the context of an application for capturing and/or analyzing communications packets, the generally executable code 416 may define various operations and analyses to be performed on communications packets. The code 416, executed within the browser 302, however, may not have direct access to the communications packets, which may be a local resource 212 of the local side 104. Accordingly, the code 416 may generate and/or cause the browser 302 to generate a resource request 428 to the local executable 306. The resource request 428 may be of any suitable form. For example, in various embodiments, the resource request may be transmitted via the interface 310 to the API 308 as a padded JavaScript Object Notation (JSONP) object.

At 430, the local executable 306 may access and/or manipulate a local resource in accordance with the resource request 428. For example, when the application is directed to capturing and/or analyzing communications packets, the resource request 428 may call a function of the local executable 306 causing the local executable to return an indication of packet captures (pcap's) present at local storage. Another type of resource request 428 may call a function of the local executable 306 causing the local executable to modify a pcap and/or generate a report including details of a pcap at local storage. Results 434 of the action of the local executable may be returned to the browser 302 (e.g., executing the code 416) at 432. At 436, the browser 302 may process the result 434. For example, in some embodiments, the code 416 may include functionality for presenting a user interface to a user on the local side utilizing the result 434.

Figure 5:
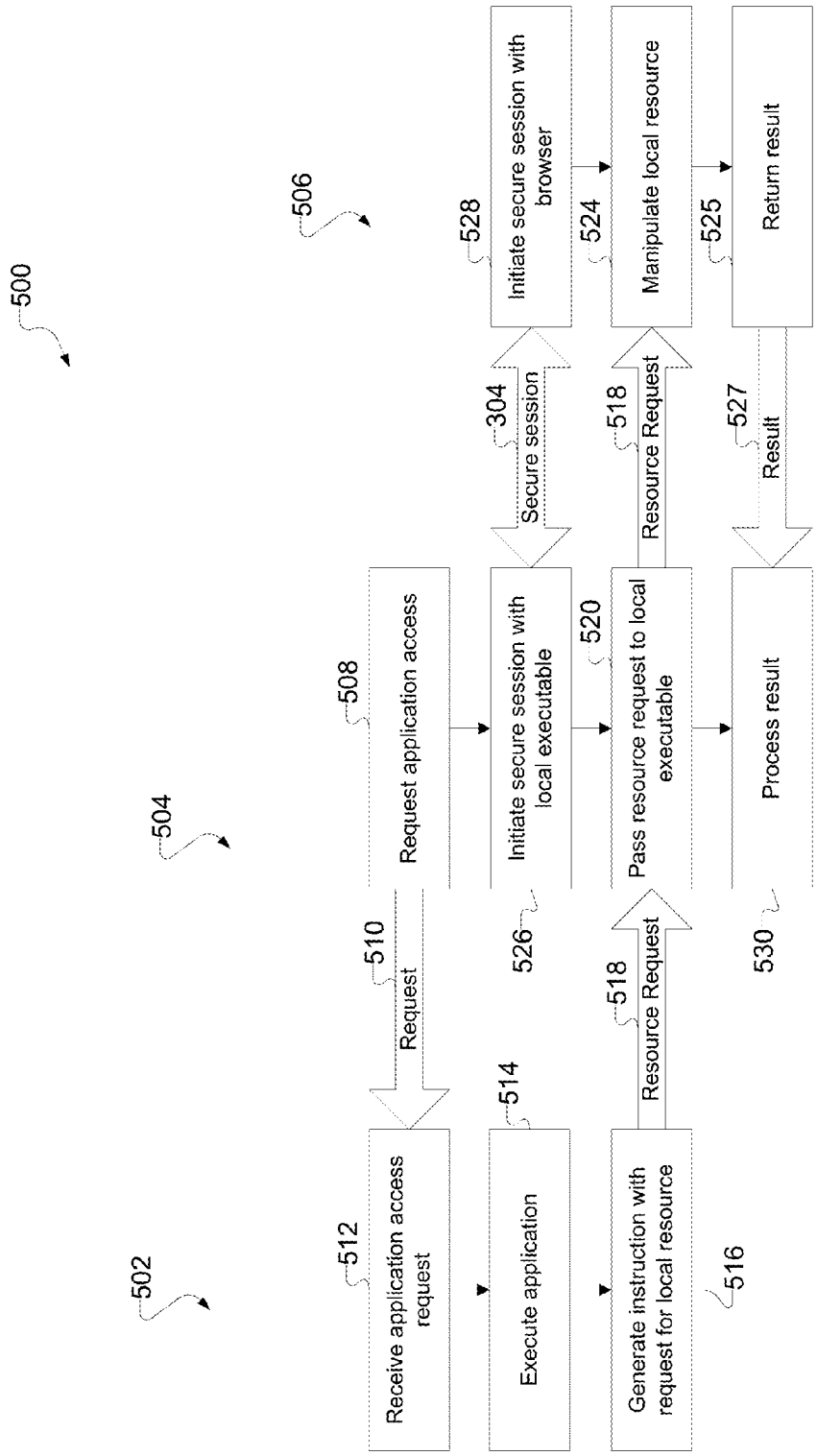
FIG. 5 illustrates another example embodiment of a process flow for providing a remotely hosted application to a local machine and/or machines.

FIG. 5 illustrates another example embodiment of a process flow 500 for providing a remotely hosted application to a local machine and/or machines. Like FIG. 4, FIG. 5 shows various actions divided by example actors for performing the actions, as indicated by columns 502, 504, 506. Column 502 may represent the actions of one or more remote machines 112 on the remote side 106. Column 504 may represent the actions of the browser 302, while column 506 may represent the actions of the local executable 306. In the example process flow 500, the high level functionality of the application is executed on the remote side 106.

At 508, the browser 302 may request access to the application. The request 510 may take any suitable form including, for example, the forms described above with respect to the request 410. At 512, the remote side 106 may receive the request. Provided that the local side 104 and/or the specific local machine 110 is authorized to access the application, the remote side 106 may execute the application (e.g., the high-level functionality of the application) at 514. At 516, the high level functionality executed on the remote side 106 may generate a request 518 to access a local resource 212. The request 518 may be provided to the browser 302, which may pass the request 518 to the local executable 306 at 520. In various example embodiments, the browser 302 may manipulate the request 518 prior to sending it to the executable 306. For example, the browser 302 may analyze the request 518 and, in some example embodiments, may screen the request 518 for security violations. At 524, the local executable 306 may access and/or manipulate a local resource 212, for example, as described above. Also, prior to sending the request, the connection 304, secure or otherwise, may be formed between the browser 302 and the local executable 306, for example, as described above and shown at 526 and 528. At 525, the local executable 306 may return results 527 of the access and/or manipulation of local resources 212 at 525. The browser 302 may process the result 527 at 530. For example, in some example embodiments, the high level functionality executed by the remote side 106 may provide the browser with templates and/or other information for presenting the result 527 in a user interface at the local machine 110. In various example embodiments, the results of processing local resources 212 may not be sent back to the remote side 106. In this manner, local resources 212, and permutations thereof, may not be sent beyond the firewall 102, enhancing security.

As described above, various example embodiments of the application described herein may be utilized to capture and/or analyze packet traffic on a network. For example, the application may be configured to act on local resources 212 (e.g., local data) to capture communications packets, perform different analyses of captured packets, perform searches identifying packets having certain characteristics, present a user interface showing the results of captures, searches, analyses, etc. In various example embodiments, the application may also generate synthetic network traffic (e.g., test packets) based on captured packets. The synthetic network traffic may be utilized, for example, to test a network or network application for security, load performance, operability, interoperability, etc. Example applications for performing tasks such as these are described, for example, in commonly assigned U.S. patent application Ser. No. 12/234,450 entitled "Test Driven Deployment and Monitoring of Heterogeneous Network Systems," filed on Sep. 19, 2008 and incorporated herein by reference in its entirety.

FIGS. 6-14 illustrate screen shots from a user interface for use with an application for capturing and/or analyzing communications packets. While a screen is used for illustration, it will be appreciated that other machine and/or human interfaces may be provided including, for example, printer-based interfaces, verbal interfaces, etc. FIG. 6 illustrates one example embodiment of a screen 600 showing captured communications packets. The screen 600 illustrates data describing three captured packets 602, 604, 608. The packets, for example, may be considered local resources 212 (e.g., local data). The browser 302 may receive locally executable code 416 and/or an instruction to capture the packets 602, 604, 608. The browser 302 may pass the instruction to the local executable 306 (e.g., via the connection 304, interface 310 and API 308). In response to the instruction, the local executable 306 may access local resources 212, including local data, to isolate the displayed packets 602, 604, 608. The packets 602, 604, 608 may be returned by the local executable 306 to the browser 302. The browser 302 may form the packets 602, 604, 608 into the screen 600, for example, according to instructions received directly or indirectly by the browser 302. The screen 600, for example, may be displayed on one or more local machines 110.

FIG. 7 illustrates one example embodiment of a screen 700 showing statistics describing a packet capture. For example, an instruction to analyze communications packets, such as 602, 604, 608 may be received by the local executable 306 from the browser 302. The local executable may extract statistics describing the packet capture and return them to the browser 302. The browser 302 may form the results into the user interface screen 700, which may be displayed on a local machine 110.

Figure 8:
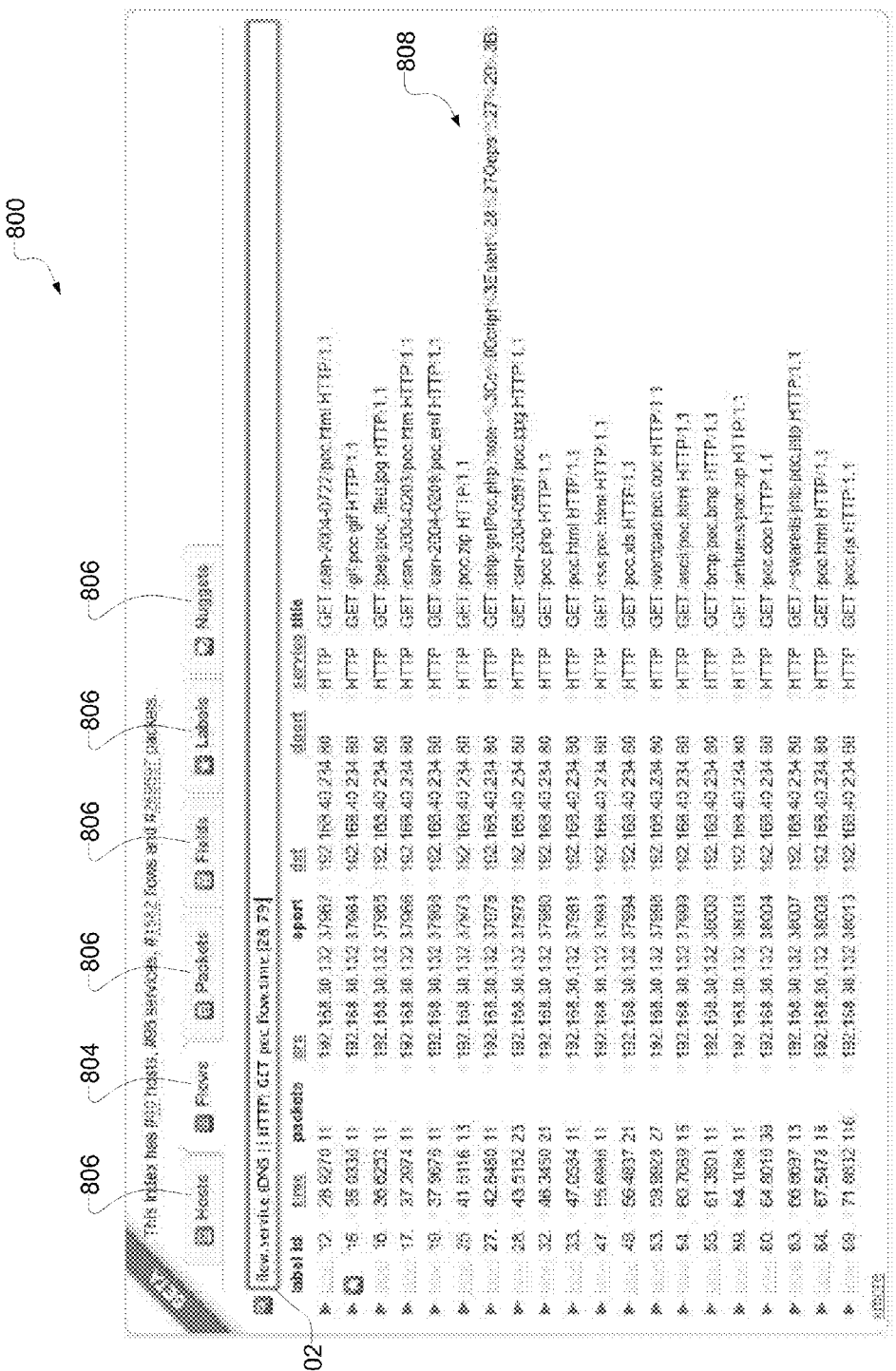
FIG. 8 illustrates one example embodiment of a screen showing results of a search of captured packets.
Figure 9:
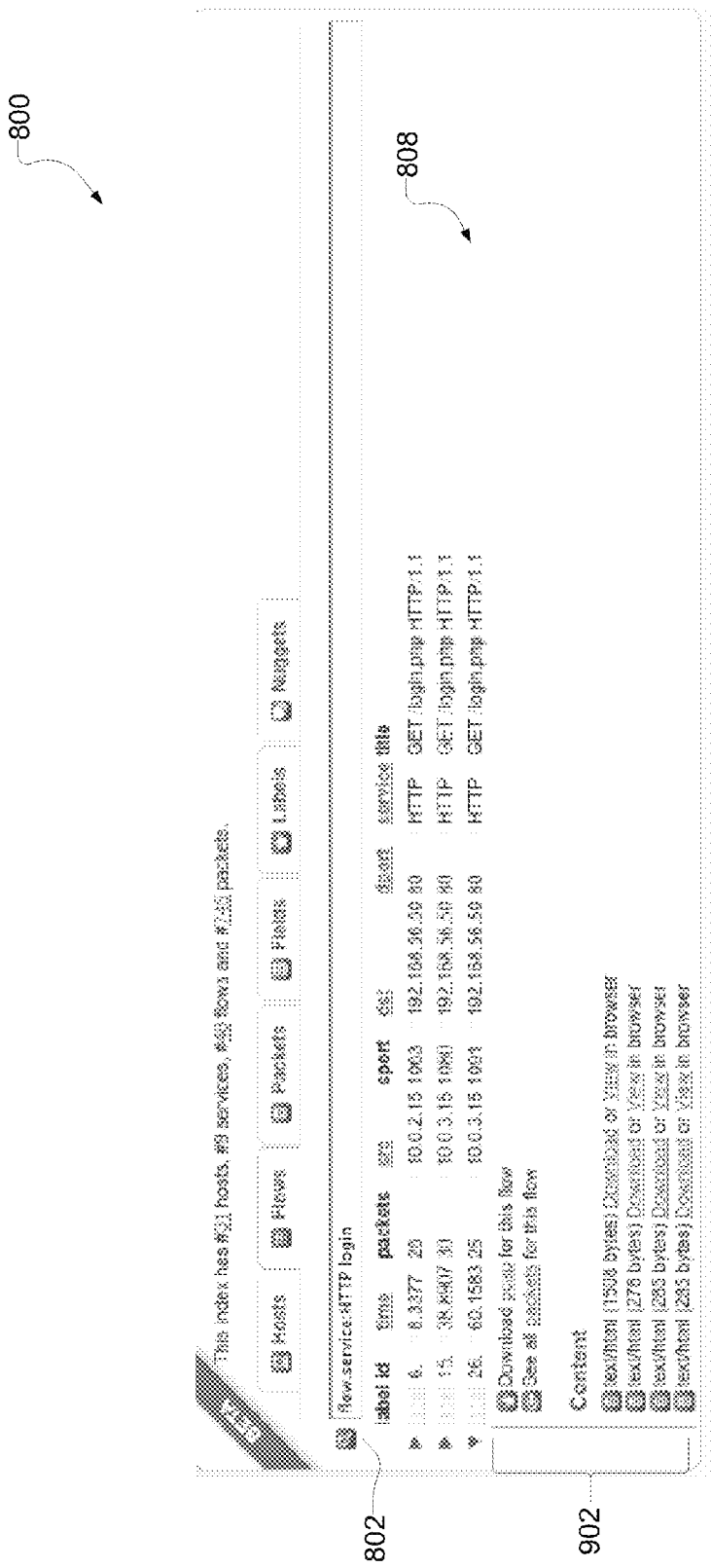
FIG. 9 illustrates one example embodiment of a screen showing the search results of FIG. 8 with additional detail.

FIG. 8 illustrates one example embodiment of a screen 800 showing results of a search of captured packets. The screen 800 may include a prompt 802 for receiving, via the local machine 110, an indication of a search to be performed on captured communications packets. Results of the search may be displayed in window 808. For example, after search parameters are determined (e.g., via the prompt 802), the browser 302 may provide an instruction to the local executable 306 causing the local executable 306 to perform the search. Results of the search (e.g., packet flows) may be provided to the browser 302, which may format the results into a user interface, such as the screen 800. The screen 800 may also display user interface tools allowing a user of the local machine 110 to transition between different tasks. For example, selecting the flow tab 804 may provide an instruction to the browser 302 to display the search screen 800 as shown. Other tabs 806 may lead a user of the local machine 110 to other functionality. FIG. 9 illustrates one example embodiment of another view of screen 800 showing the search results of FIG. 8 with additional detail. For example, a user of the local machine 110 may cause the screen 800 to display by selecting one of the packet flows of the screen 800. Selecting a packet flow may cause additional information about the packet flow to be displayed at field 902. For example, selecting a packet flow from the search results of FIG. 8 may prompt the executed code 416 and/or remote side 106 to generate an instruction requesting additional information about the selected packet flow. The instruction may be provided to the local executable 302, which may operate on local resources 212 to extract the additional information and provide it to the browser 302. The browser 302 may incorporate the additional information into the screen 800, as shown.

Figure 10:
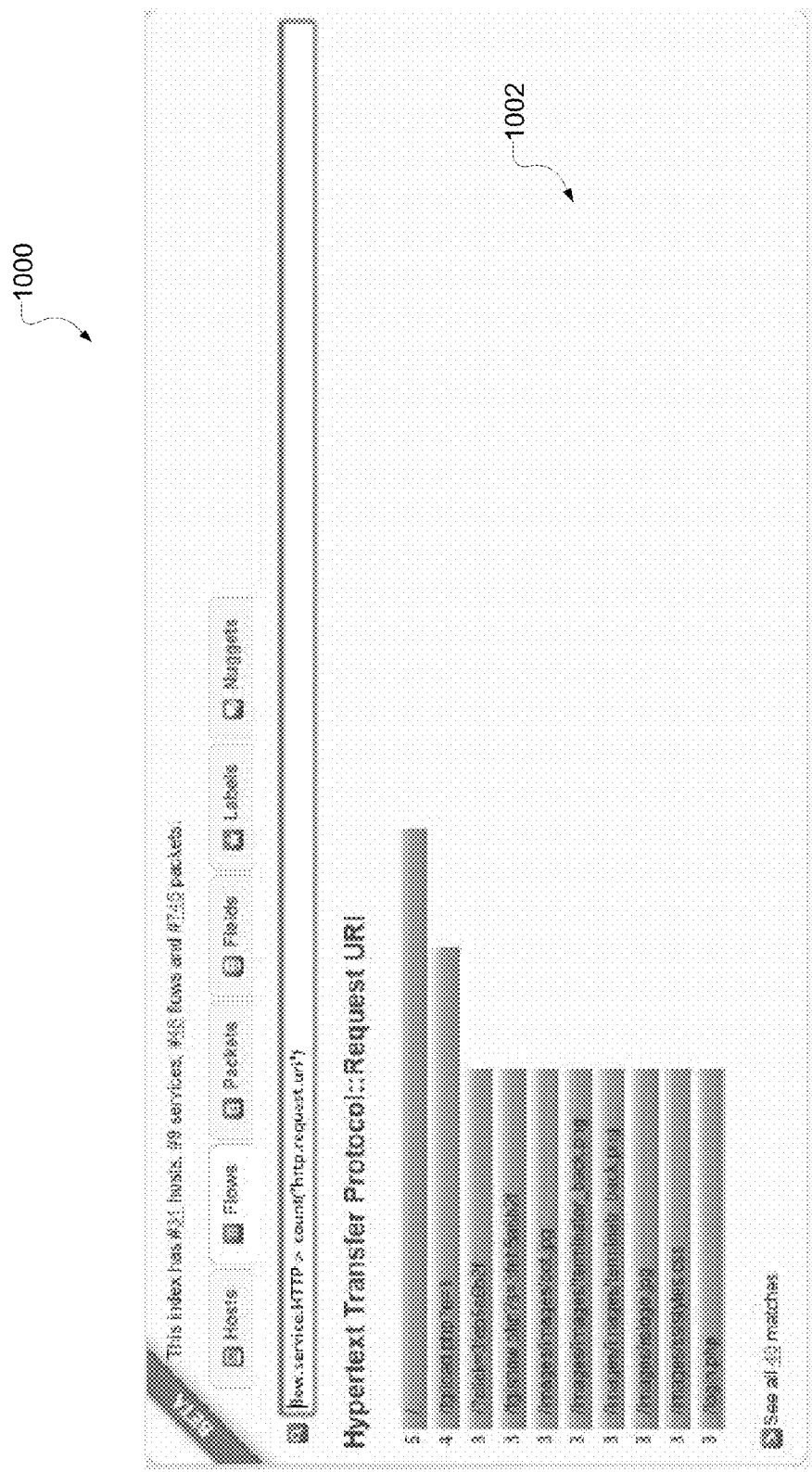
FIG. 10 illustrates one example embodiment of a screen showing results of analysis of capture packets.
Figure 11:
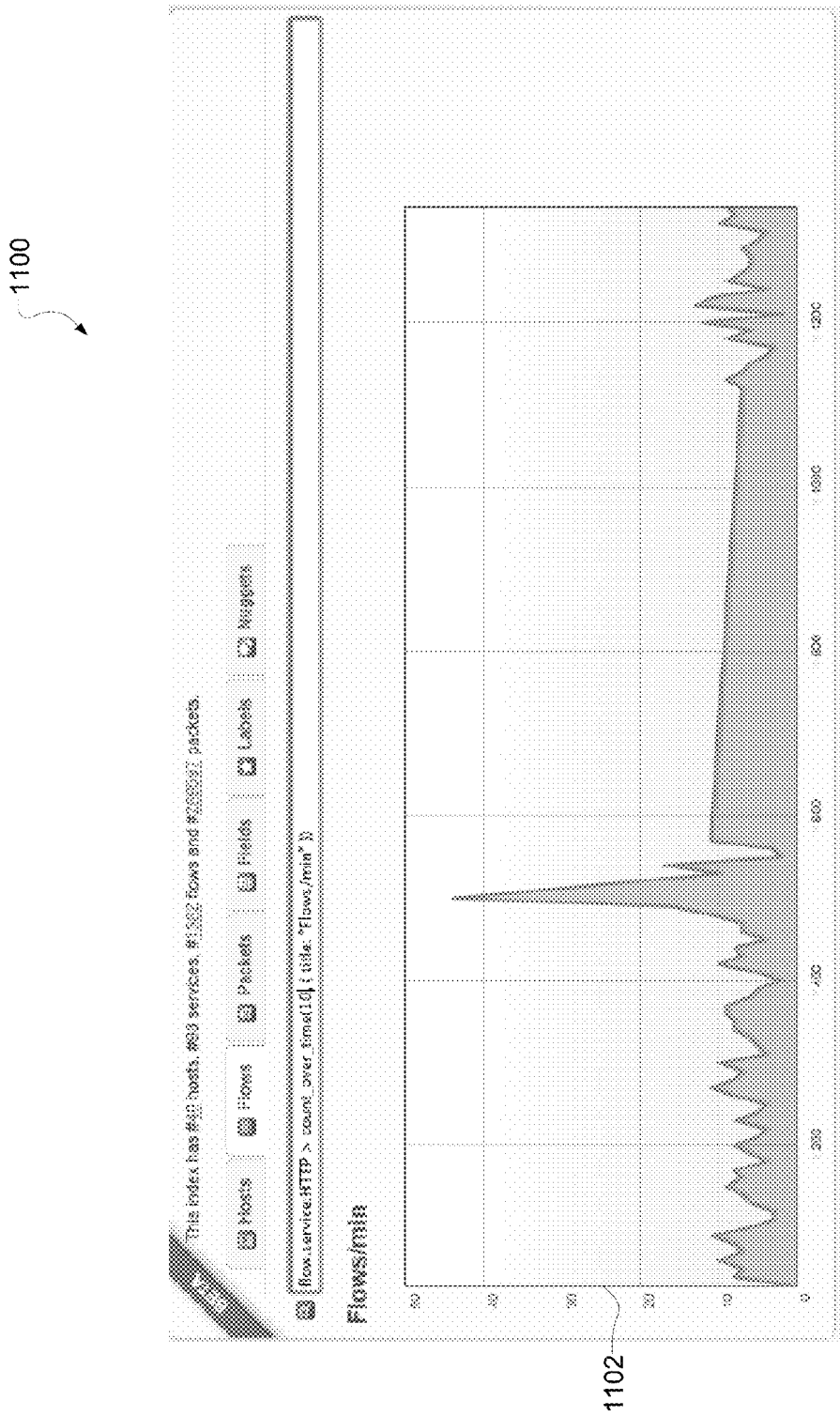
FIG. 11 illustrates one example embodiment of a screen showing results of a packet traffic analysis.

FIG. 10 illustrates one example embodiment of a screen 1000 showing results of analysis of captured packets. For example, the screen 1000 may include a window 1002 showing network arranged based on the number of packets originated and/or received by each node. For example, this data may be extracted from local resources 212 by the local executable 206 and formed into the screen 1000 by the browser 302 (e.g., based on the execution of the code 416 and/or from instructions received from the remote side). FIG. 11 illustrates one example embodiment of a screen 1100 showing results of a packet traffic analysis. The screen 1100 includes a graph 1102 showing a number of packet flows per minute present on a network over time. For example, the local executable 306 may receive an instruction to monitor the network traffic from the browser 302. Results of the monitoring may be returned to the browser 302, which may incorporate the results to form the screen 1100 as shown.

Figure 12:
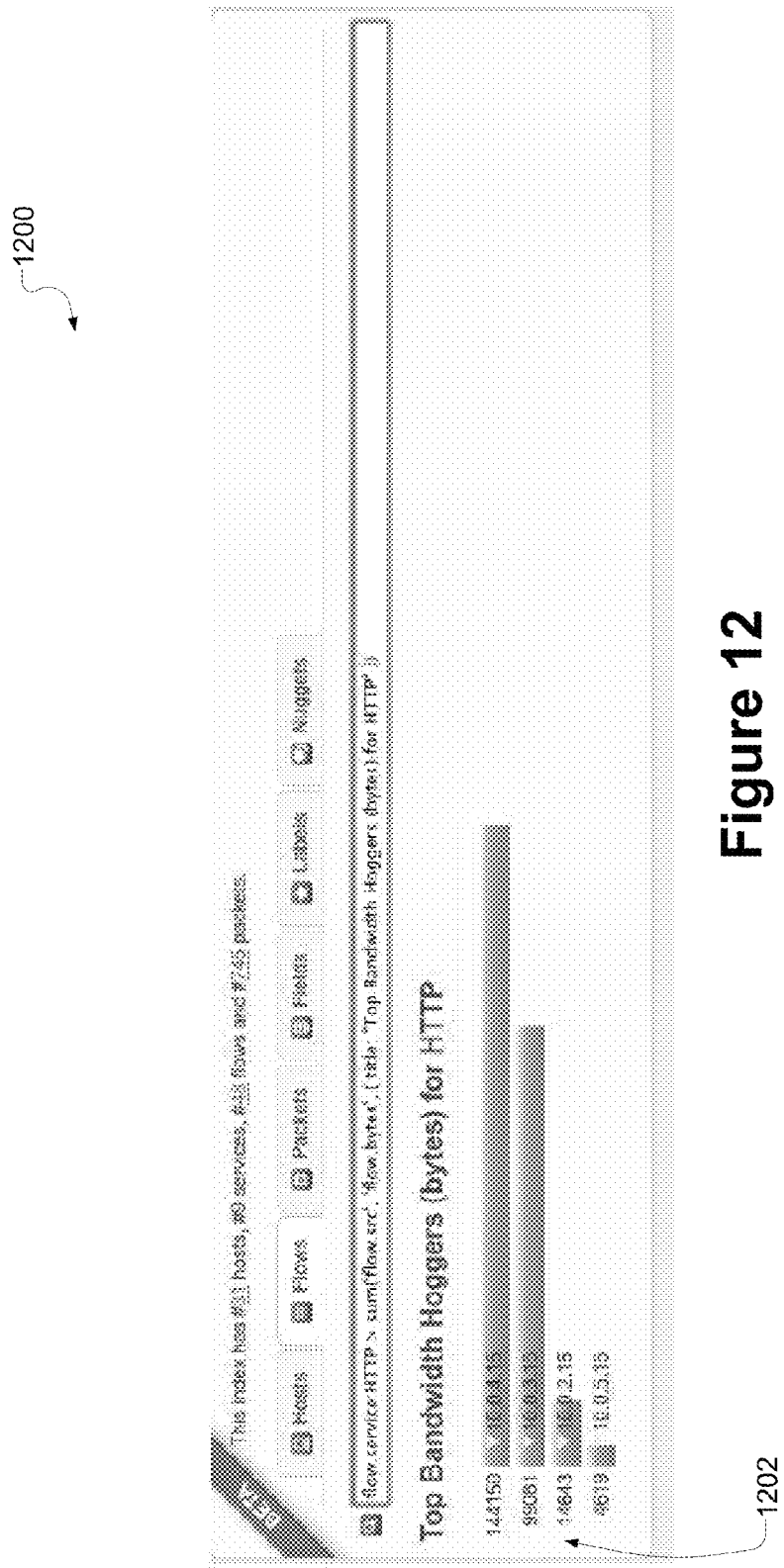
FIG. 12 illustrates one example embodiment of a screen showing an analysis of bandwidth usage by different network nodes.
Figure 13:
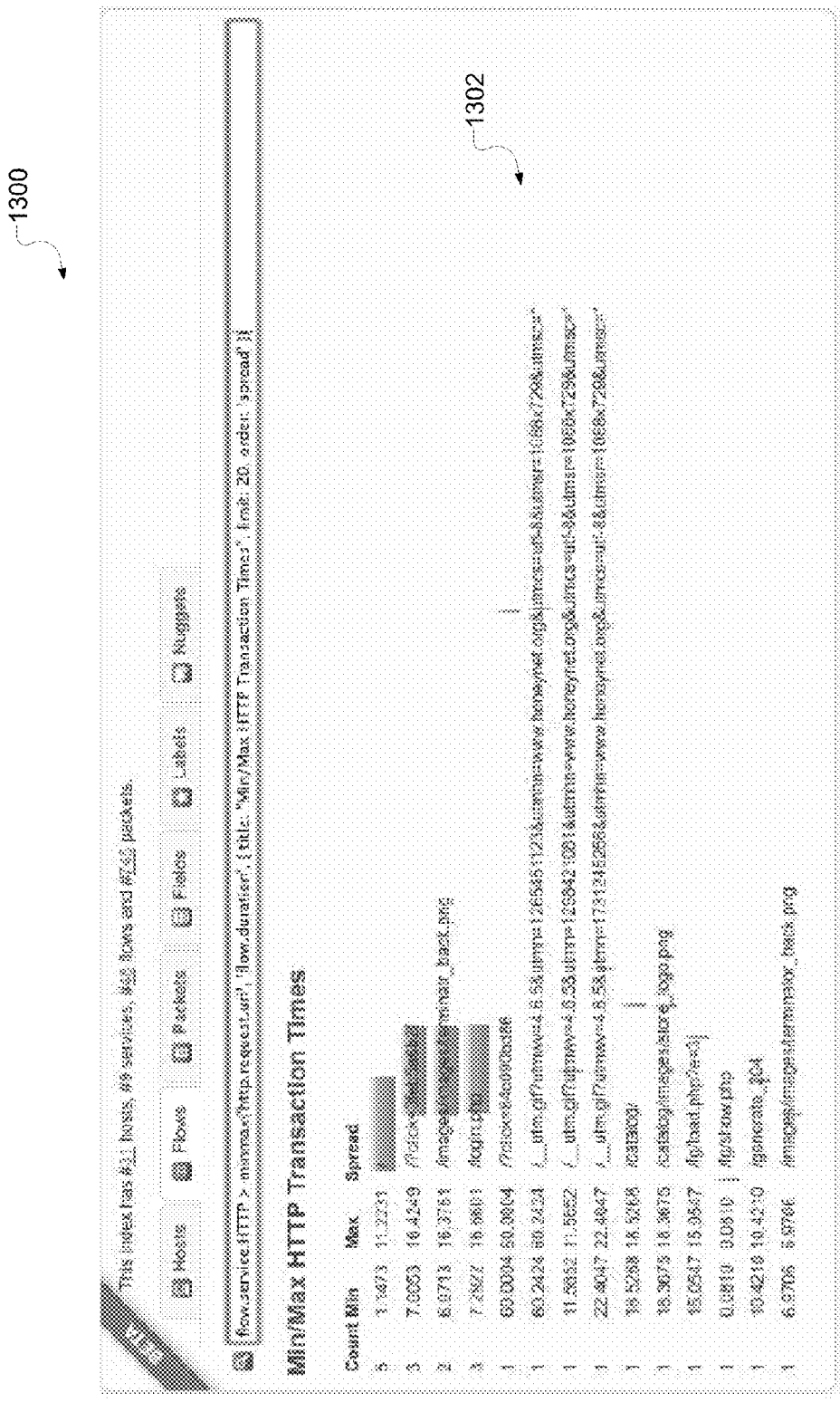
FIG. 13 illustrates one example embodiment of a screen showing transaction times for different captured packet flows.

FIG. 12 illustrates one example embodiment of a screen 1200 showing an analysis of bandwidth usage by different network nodes. The screen 1200 includes a window 1202 showing a graphical representation of bandwidth usage. For example, the local executable 306 may receive an instruction from the browser 302 causing the local executable 306 to monitor the bandwidth usage of all or a portion of network nodes. Results of the monitoring may be provided by the local executable 306 to the browser 302, which may generate the screen 1200. FIG. 13 illustrates one example embodiment of a screen 1300 showing transaction times for different captured packet flows. Again, the transaction times may be monitored by the local executable 302 in response to an instruction from the browser 302. Results of the monitoring may be returned to the browser 302, which may generate the screen 1300.

Figure 14:
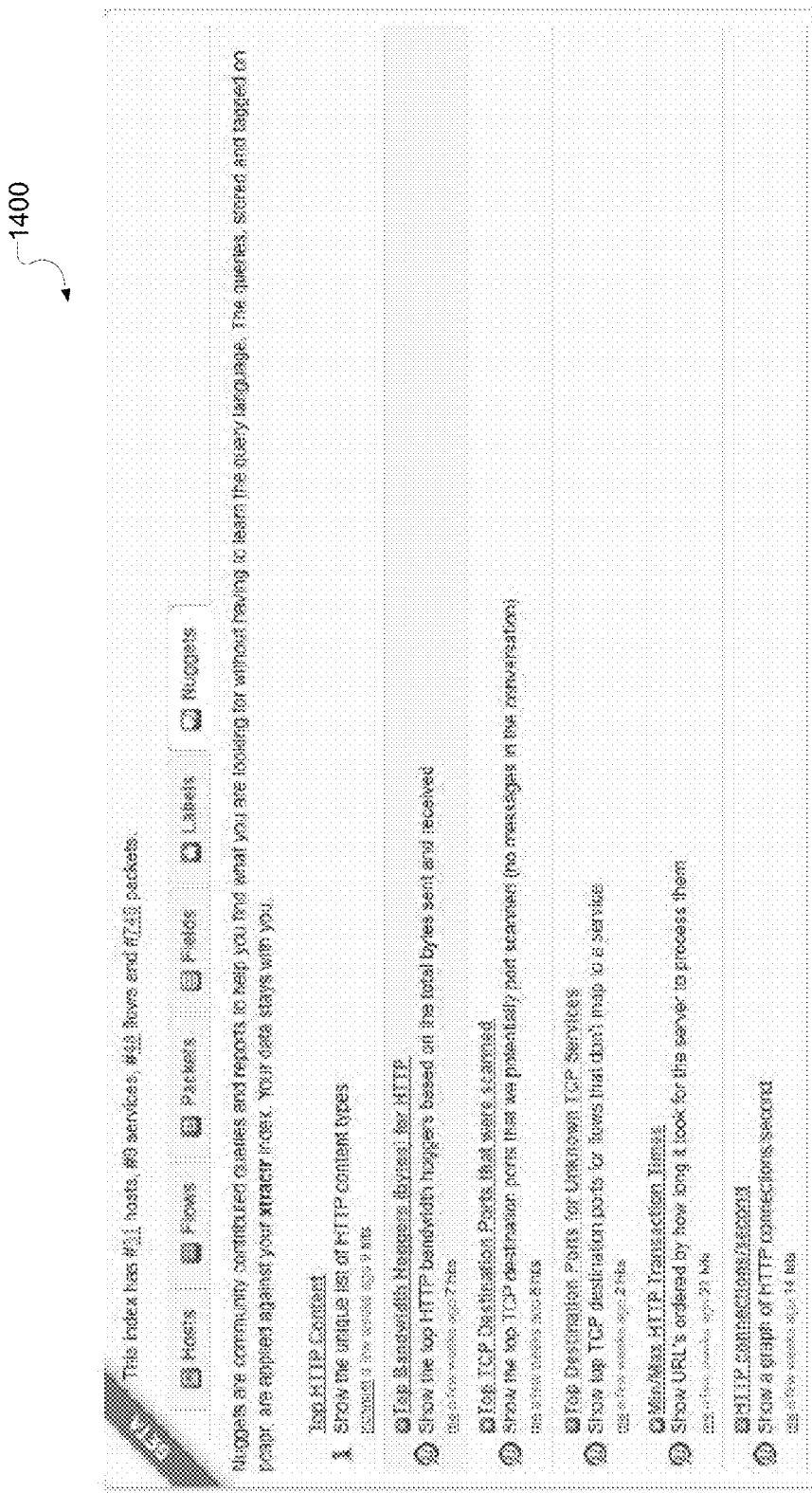
FIG. 14 illustrates one example embodiment of a screen showing optional data and/or functionality that may be shared utilizing the remote side.

FIG. 14 illustrates one example embodiment of a screen 1400 showing optional data and/or functionality that may be shared utilizing the remote side 106. For example, a user at a local machine 110 may choose to share certain data, results, or functionality generated on the local sided 104 with other users on other networks. Such data or analysis, for example, may be nonsensitive and/or may be scrubbed of sensitive content.

Different computer systems such as local machines 110 on the local side 104 and remote machines 112 on the remote side 106 are described herein as communicating with one another. It will be appreciated that this communication may take place in any suitable method. For example, in some example embodiments, some or all of the computer systems described herein may be in communication with one another via a network or networks. The network or networks may operate according to any suitable wired or wireless communication protocol and may utilize any suitable hardware or software. In some example embodiments, the network or networks may include, a wide area network (WAN) such as the Internet, a local area network (LAN), etc.

When communications between the machines 110, 112 take place over the Internet or other public network, it will be appreciated that these communications may be encrypted. For example, one or more of the systems may utilize an asymmetric or public key infrastructure (PKI) method. According to a PKI system, each system may have a public key that may be used for encrypting messages and a private key that may be used for decryption. The public key may be provided to any systems having need to send data to the first system. The data may be encrypted with the public key such that it may only be decrypted with the private key, which may be kept secret by the receiving system. In this manner, all communications between the various systems may be decrypted only by their intended recipients.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention. Also, while specific testing applications have been described herein, it will be appreciated that the applications provided according to the description herein may include other testing applications as well as non-testing applications, such as word processors, virus scanning software, etc.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

Moreover, the processes associated with the present example embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, any non-transitory media such as, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. It will be appreciated that the term non-transitory refers to the medium and not to any data stored thereon. For example, a random access memory (RAM) is non-transitory, although the data stored thereon may change regularly.

A "computer," "machine," "computer device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed example embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various example embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various example embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various example embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various example embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain example embodiments, routers or other like networking devices may be used to forward data packets between networks using headers and forwarding tables to determine an optimum path through which to transmit the packets.

As employed herein, an application server may be a server that hosts an API, such as the API 308, to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While various example embodiments of the invention have been described herein, it should be apparent, however, that various modifications, alterations and adaptations to those embodiments may occur to persons skilled in the art with the attainment of some or all of the advantages of the present invention. The disclosed example embodiments are therefore intended to include all such modifications, alterations and adaptations without departing from the scope and spirit of the present invention as set forth in the appended claims.

I claim:

1. A computer-implemented method for receiving and executing an application from at least one remote machine, the method comprising:
   executing, by a computer device, a local executable, wherein the local executable has access to local resources of the computer device, wherein the first computer machine comprises at least one processor and operatively associated memory;
   executing a browser, by the computer device, wherein the browser is configured to communicate with at least one remote machine through a firewall;
generating a connection between the browser and the local executable not running in the browser, wherein the local executable has access to local resources of the computer device that code running in the browser is not authorized to access;
   downloading code for implementing a portion of the application wherein the code is downloaded from the at least one remote machine through the firewall;
   executing the code in the browser; and
   generating, by the browser, an instruction directing the local executable to act on the local resources of the computer device and to:
      communicate the instruction to the local executable via the connection;
      act, by the local executable, on the local resources of the computer device in response to the instruction, wherein the act comprises generating synthetic network traffic based on at least one communication packet; and
      return to the browser results of the action of the local executable on the local resources.

2. The method of claim 1, wherein the local resources of the computer device comprise resources hosted by the computer device and resources hosted by at least one second computer device in communication with the computer device, wherein the computer device and the at least one second computer device are both separated from the at least one remote machine by the firewall.

3. The method of claim 1, wherein the local resources comprise communications packets.

4. The method of claim 1, wherein the act performed by the local executable on the local resources further comprises at least one action selected from the group consisting of: capturing at least one communications packet; searching a plurality of communications packets; and formatting at least one communications packet.

5. The method of claim 1, wherein executing the code in the browser comprises executing the code such that operations of the code are prevented from acting on the local resources except through the browser.

6. The method of claim 1, wherein the local executable is configured to implement an application programming interface (API), and wherein the instruction is communicated to the local executable via the API.

7. The method of claim 1, wherein the local executable is configured to implement a web server, and wherein the connection between the browser and the local executable is maintained through the web server.

8. The method of claim 1, wherein the connection between the browser and the local executable is a secure connection.

9. The method of claim 1, further comprising reporting, by the browser, the results of the action of the local executable through a user interface, wherein the user interface is defined by the code.

10. The method of claim 1, wherein the application is configured to perform at least one task selected from the group consisting of communications packet capture, communications packet analysis, word processing, and virus scanning.

11. The method of claim 1, wherein the code is generally executable.

12. The method of claim 1, wherein the code is formatted according to the JAVASCRIPT scripting language.

13. The method of claim 1, further comprising downloading the local executable from the remote machine through the firewall.

14. A computer-implemented method for providing an application to at least one local computer device, the method comprising:
   transmitting, by a computer device to a browser executing on the at least one local machine, code for implementing a portion of the application, and wherein the code is configured to be executed in the browser to cause the browser to:
generate an instruction directing a local executable to act on local resources of the computer device, wherein the local executable is not running in the browser and is configured to access the local resources, and wherein the acting on local resources comprises generating synthetic network traffic based on at least one communication packet;
   generate a connection between the browser and the local executable, wherein the local executable has access to local resources of the computer device that code running in the browser is not authorized to access;
   communicate the instruction to the local executable via the connection;
   receive, from the local executable, a result of the action of the local executable on the local resources.

15. The method of claim 14, further comprising transmitting the local executable to the local computer device.

16. The method of claim 14, wherein the local resources comprise communications packets.

17. The method of claim 14, wherein the local resources are separated from the computer device by a firewall.

18. A computer system for hosting and executing an application, the computer system comprising:
   at least one remote machine comprising at least one processor and operatively associated memory, wherein the at least one remote machine is programmed to transmit code for implementing a portion of the application; and
   at least one local machine comprising at least one processor and operatively associated memory, wherein the at least one local machine is programmed to:
      execute a local executable not running in the browser, wherein the local executable has access to local resources of the at least one local machine;
      execute a browser, wherein the browser is configured to communicate with the at least one remote machine through a firewall;
      generate a connection between the browser and the local executable not running in the browser, wherein the local executable has access to local resources of the computer device that code running in the browser is not authorized to access; download the code for implementing a portion of the application from the at least one remote machine through the firewall;

execute the code in the browser;

generate, by the browser, an instruction directing the local executable to act on the local resources of the at least one local machine to:

communicate the instruction to the local executable via the connection;

act, by the local executable, on the local resources of the computer device in response to the instruction, wherein the act comprises generating synthetic network traffic based on the at least one communication packet; and return to the browser, by the local executable, results of the action of the local executable on the resources.

19. A computer-implemented method for receiving and executing an application from at least one remote machine, the method comprising:

executing a local executable, wherein the local executable has access to local resources of the computer device;

executing a browser, wherein the browser is configured to communicate with at least one remote machine through a firewall;

generating a connection between the browser and the local executable, wherein the local executable has access to local resources of the computer device that code running in the browser is not authorized to access;

receiving through the browser and from the at least one remote machine an instruction directing the local executable to act on the local resources of the computer device to:

communicate the instruction from the browser to the local executable via the connection;

act, by the local executable, on the local resources of the computer device in response to the instruction, wherein the act comprises generating synthetic network traffic based on at least one communication packet;

return to the browser results of the action of the local executable on the local resources.

20. The method of claim 19, wherein the local resources comprise communications packets.

21. A computer-implemented method for providing an application to at least one local computer device, the method comprising:

transmitting to a browser executed by the local computer device an instruction directing a local executable not running in the browser to act on the local resources of the local computer device that to code running in the browser is not authorized to access, wherein the act comprises generating synthetic network traffic based on at least one communication packet; and transmitting to the browser an instruction for processing results of the action of the local executable on the local resources.

22. The method of claim 21, further comprising transmitting a local executable to a local computer device, wherein the local executable is configured to access local resources of the computer device.

23. The device of claim 21, wherein the local resources comprise communications packets.

24. The device of claim 21, wherein the local resources are separated from the computer device by a firewall.

* * * * *